(12) United States Patent
Nebashi et al.

(10) Patent No.: US 10,027,936 B2
(45) Date of Patent: Jul. 17, 2018

(54) PROJECTOR AND CONTROL METHOD FOR PROJECTOR

(71) Applicant: Seiko Epson Corporation, Tokyo (JP)

(72) Inventors: Isao Nebashi, Tatsuno-machi (JP); Masaki Uemori, Beppu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/118,793

(22) PCT Filed: Feb. 27, 2015

(86) PCT No.: PCT/JP2015/001033
§ 371 (c)(1),
(2) Date: Aug. 12, 2016

(87) PCT Pub. No.: WO2015/133105
PCT Pub. Date: Sep. 11, 2015

(65) Prior Publication Data
US 2017/0064273 A1 Mar. 2, 2017

(30) Foreign Application Priority Data

Mar. 3, 2014 (JP) .................................. 2014-040164
Nov. 7, 2014 (JP) .................................. 2014-226721

(51) Int. Cl.
*G03B 21/26* (2006.01)
*H04N 9/31* (2006.01)
(Continued)

(52) U.S. Cl.
CPC ........... *H04N 9/3185* (2013.01); *G03B 21/26* (2013.01); *G03B 43/00* (2013.01); *G09G 5/00* (2013.01);
(Continued)

(58) Field of Classification Search
CPC ........ G03B 21/00; G03B 21/14; G03B 21/26; H04N 9/3102; H04N 9/3179;
(Continued)

(56) References Cited

U.S. PATENT DOCUMENTS 5,396,301 A 3/1995 Sasaki et al.
5,477,280 A 12/1995 Ko
(Continued)

FOREIGN PATENT DOCUMENTS

JP 4-54779 A 2/1992
JP 5-207405 A 8/1993
(Continued)

OTHER PUBLICATIONS

International Search Report, International Application No. PCT/JP2015/001033, dated May 19, 2015.

*Primary Examiner* — Sultan Chowdhury
(74) *Attorney, Agent, or Firm* — ALG Intellectual Property, LLC

(57) ABSTRACT

A projector includes: an image projection unit which projects an image; a display unit provided on a main body of the projector; a storage unit which stores ID information of the projector; an instruction receiving unit which receives an instruction to the projector; and a control unit which causes the image projection unit to project the ID information stored in the storage unit and causes the display unit to display the ID information, when the instruction receiving unit receives a first instruction operation.

12 Claims, 11 Drawing Sheets

(51) Int. Cl.
   *G09G 5/00*    (2006.01)
   *G09G 5/38*    (2006.01)
   *H04N 5/74*    (2006.01)
   *G03B 43/00*   (2006.01)

(52) U.S. Cl.
   CPC .............. *G09G 5/38* (2013.01); *H04N 5/74* (2013.01); *H04N 9/3147* (2013.01); *H04N 9/3179* (2013.01); *H04N 9/3182* (2013.01); *G03B 2206/00* (2013.01)

(58) Field of Classification Search
   CPC ........... H04N 21/4122; H04N 21/4312; H04N 21/4366; H04N 21/4622
   See application file for complete search history.

(56) References Cited

U.S. PATENT DOCUMENTS

| | | | | |
|---|---|---|---|---|
| 6,783,252 | B1* | 8/2004 | Cambron | G03B 21/26 348/E5.137 |
| 7,789,364 | B2 | 9/2010 | Katsumata et al. | |
| 8,007,111 | B2* | 8/2011 | Kojima | H04N 9/3188 353/28 |
| 8,804,053 | B2* | 8/2014 | Kim | H04N 9/3194 348/333.1 |
| 2007/0252059 | A1 | 11/2007 | Katsumata et al. | |
| 2008/0074560 | A1* | 3/2008 | Ichieda | H04N 9/3197 348/739 |
| 2011/0090409 | A1* | 4/2011 | Kawasaki | G03B 21/26 348/744 |
| 2012/0242908 | A1* | 9/2012 | Tsukagoshi | H04N 9/3179 348/734 |
| 2013/0329196 | A1 | 12/2013 | Aruga et al. | |
| 2014/0168618 | A1 | 6/2014 | Kinebuchi et al. | |

FOREIGN PATENT DOCUMENTS

| | | |
|---|---|---|
| JP | 7-15740 A | 1/1995 |
| JP | 7-56137 A | 3/1995 |
| JP | 10-111532 A | 4/1998 |
| JP | 2000-206482 A | 7/2000 |
| JP | 2004-295038 A | 10/2004 |
| JP | 2007-256725 A | 10/2007 |
| JP | 2008-102243 | 5/2008 |
| JP | 2009-282431 A | 12/2009 |
| JP | 2012-78641 A | 4/2012 |
| JP | 2013-254051 A | 12/2013 |
| JP | 2014-119688 A | 6/2014 |

* cited by examiner

PROJECTOR AND CONTROL METHOD FOR PROJECTOR

CROSS-REFERENCE TO RELATED APPLICATIONS

This application is the U.S. National Phase under 35 U.S.C. § 371 of International Application No. PCT/JP2015/001033 filed on Feb. 27, 2015, which in turn claims the benefit of Japanese Application No. 2014-040164 filed on Mar. 3, 2014, and Japanese Application No. 2014-226721 filed on Nov. 7, 2014, the disclosures of which are expressly incorporated by reference herein.

TECHNICAL FIELD

The present invention relates to a projector and a control method for a projector.

BACKGROUND ART

According to the related art, a multi-projection system which projects an image using a plurality of projectors is known. The multi-projection system may have a mode in which images from individual projectors are projected to different places, a mode in which images are arrayed in tiling manner to form a single image and this single image is projected, a mode in which images are projected in a superimposed state (stack projection), and the like. In such a multi-projection system, depending on the installation positions and projection angles of the plurality of projectors, the correspondence between the projectors and the projection images may be hard to grasp in some cases. If which projector projects which image is not known as in such cases, the projection image from an unintended projector may be adjusted erroneously at the time of adjusting the projection image from each projector. Thus, PTL 1 discloses a projector which projects and displays an ID that is set for the projector (display control device), on a projection surface.

SUMMARY

However, even in the case where an ID is projected on the projection surface in with the projector of PTL 1, there is a problem that if there is a plurality of projectors, which projector is projecting the ID is hard to grasp. That is, the correspondence between the projectors and the projection images is hard to grasp. Therefore, it is difficult to determine the projector to be adjusted, unless change in the projection images is checked by operating the projectors.

The invention has been made to solve at least a part of the problems described above, and the invention can be implemented as the following forms or application examples.

Application Example 1

A projector according to this application example is directed to a projector characterized by including: an image projection unit which projects an image; a display unit provided on a main body of the projector; a storage unit which stores ID information of the projector; an instruction receiving unit which receives an instruction to the projector; and a control unit which causes the image projection unit to project the ID information stored in the storage unit and causes the display unit to display the ID information, when the instruction receiving unit receives a first instruction operation.

According to such a projector, in addition to the image projection unit, the display unit is provided in the main body of the projector. The storage unit stores the ID information of the projector. The instruction receiving unit receives an instruction to the projector. The control unit causes the image projection unit to project the ID information and causes the display unit to display the ID information, when the instruction receiving unit receives a first instruction operation. Thus, since the ID information is displayed both in the projection image and on the display unit, the user can recognize the correspondence between the projector and the projection image.

Application Example 2

This application example is characterized in that, in the projector according to the application example described above, the project further includes a projection position decision unit which decides a position on a projection image where the ID information is projected and displayed, and that the control unit causes the image projection unit to project and display the ID information at the position on the projection image decided by the projection position decision unit.

According to such a projector, the projection position decision unit decides the position on the projection image where the ID information is projected and displayed. The control unit causes the image projection unit to project and display the ID information at the position on the projection image that is decided. Thus, the ID information can be projected and displayed at the position decided by the projection position decision unit.

Application Example 3

This application example is characterized in that, in the projector according to the application example described above, the projection position decision unit decides the position on the projection image where the ID information is projected and displayed, on the basis of a second instruction operation received by the instruction receiving unit, and causes the storage unit to store the position.

According to such a projector, the projection position decision unit decides the position on the projection image where the ID information is projected and displayed, on the basis of a second instruction operation received by the instruction receiving unit, and stores the position in the storage unit. Thus, the position on the projection image where the ID information is projected and displayed can be decided according to a second instruction operation, that is, according to a user operation, and stored in the projector.

Application Example 4

This application example is characterized in that, in the projector according to the application example described above, the control unit causes the storage unit to store the ID information on the basis of a third instruction operation received by the instruction receiving unit.

According to such a projector, the control unit causes the storage unit to store the ID information on the basis of a third instruction operation received by the instruction receiving unit. Thus, the ID information can be inputted and stored in the projector according to a third instruction operation, that is, according to a user operation.

Application Example 5

This application example is characterized in that, in the projector according to the application example described above, the control unit causes the image projection unit to project the ID information and causes the display unit to display the ID information for a predetermined time after the instruction receiving unit receives the first instruction operation.

According to such a projector, the control unit causes the image projection unit to project the ID information and causes the display unit to display the ID information for a predetermined time after the first instruction operation is received. Thus, the projection of the ID information and the display on the display unit are erased as a predetermined time passes. Therefore, even if the user forgets to erase the ID information, the ID information is erased after the lapse of a predetermined time.

Application Example 6

This application example is characterized in that, in the projector according to the application example described above, the control unit switches between normal projection in which the ID information and the image are projected without flashing on and off and flashing projection in which the ID information and the image are projected in such a way as to flash on and off.

According to such a projector, the control unit switches between normal projection in which the ID information and the image are projected without flashing on and off and flashing projection in which the ID information and the image are projected in such a way as to flash on and off. Thus, the correspondence between the ID information and the projection image, and the projector, can be easily recognized by switching to the normal projection or the flashing projection.

Application Example 7

This application example is characterized in that, in the projector according to the application example described above, the control unit controls switching between the normal projection and the flashing projection on the basis of the ID information in such a way that the flashing projection when the storage unit stores first ID information and the flashing projection when the storage unit stores second ID information that is different from the first ID information do not overlap with each other.

According to such a projector, the control unit controls switching between the normal projection and the flashing projection on the basis of the ID information in such a way that the flashing projection with the first ID information and the flashing projection with the second ID information do not overlap with each other. Thus, since the flashing projections with different ID information do not overlap in the projector, the correspondence between the ID information and the projection image that are projected in such a way as to flash on and off, and the projector, can be easily recognized.

Application Example 8

In the projector according to the application example described above, it is preferable that the control unit cause the image projection unit to project an image of a frame according to the ID information when the instruction receiving unit receives the first instruction operation.

According to such a projector, the control unit cause the image projection unit to project an image of a frame according to the ID information when the instruction receiving unit receives the first instruction operation. Thus since an image of a different frame is projected when the ID information of the projector is different, even in a situation in which the projected ID information cannot be visually recognized, the projector can easily be discriminated on the basis of the image of the frame.

Application Example 9

This application example is characterized in that, in the projector according to the application example described above, the control unit changes the frame projected on the image projection unit when the instruction receiving unit further receives a fourth instruction operation after the instruction receiving unit receives the first instruction operation.

According to such a projector, the control unit changes and projects the projected frame when the instruction receiving unit further receives an instruction operation after the instruction receiving unit receives the first instruction operation. Thus, since the projected frame is changed, it is possible to visually recognize the projection image of the projected being instructed and operated easily.

Application Example 10

In the projector according to the application example described above, it is preferable that the control unit sets a color of the frame according to the ID information.

According to such a projector, since the color of the frame is set according to the ID information, it is possible to easily discriminate the projector which projects the frame by visually recognizing the color of the frame.

Application Example 11

In the projector according to the application example described above, the control unit may project the image of the frame on an outer edge of an area where the image projection unit can project.

Application Example 12

A control method for a projector according to this application example is directed to a control method for a projector including an image projection unit which projects an image and a storage unit which stores ID information, and is characterized in that the projector further includes a display unit provided on a main body of the projector, and that the method includes: an instruction receiving step of receiving an instruction to the projector; and a control step of causing the image projection unit to project the ID information stored in the storage unit and causing the display unit to display the ID information, when a first instruction operation is received by the instruction receiving step.

According to such a control method for the projector, since the ID information is displayed both in the projection image and on the display unit, the correspondence between the projector and the projection image can be recognized.

In addition, in the case where the projector and the control method for the projector described above are constructed using a computer provided in the projector, the above forms and the above application examples can be configured in the form of a program for realizing the functions thereof, or a recording medium or the like on which the program is recorded in such a way as to be readable by the computer. As the recording medium, various media that are readable by the computer can be used, such as flexible disk, HDD (hard disk drive), CD-ROM (compact disk read only memory), DVD (digital versatile disk), Blu-ray (trademark registered) disc, magneto-optical disk, non-volatile memory card, internal storage device of the projector (semiconductor memory such as RAM (random access memory) or ROM (read only memory)), and external storage device (USB (universal serial bus) memory or the like).

BRIEF DESCRIPTION OF THE DRAWINGS

FIG. 1A is a perspective view as seen from the front. FIG. 1B is a perspective view as seen from the rear.

FIG. 5A is an explanatory view showing the projection state of five projectors. FIG. 5B is an explanatory view in the case where images are projected in a superimposed state.

FIG. 6A is an explanatory view in the case where ID information is "1". FIG. 61B is an explanatory view in the case where ID information is "2". FIG. 6C is an explanatory view in the case where there is no ID information.

DESCRIPTION OF EXEMPLARY EMBODIMENTS

Embodiment 1

Hereinafter, a projector capable of displaying ID information will be described as Embodiment 1.

Figure 1A:
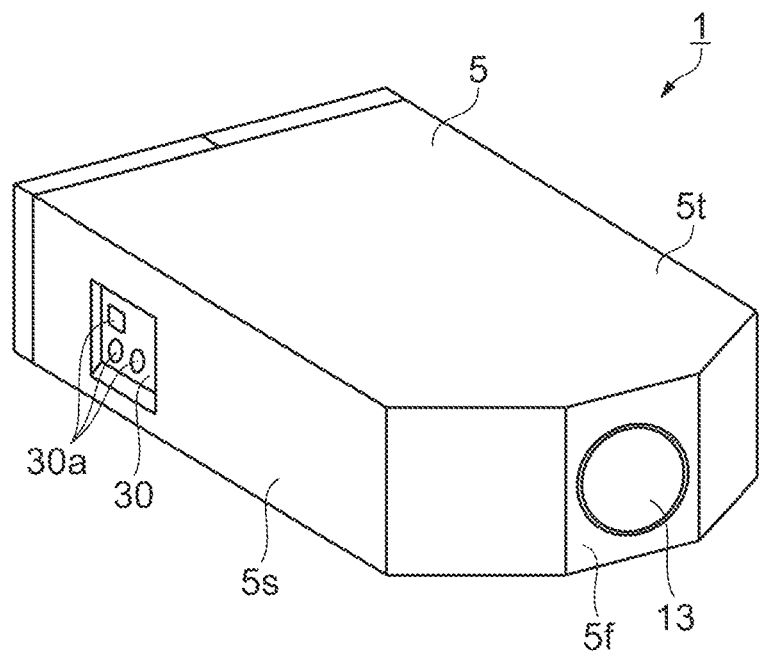
FIGS. 1A and 1B are perspective views of a projector according to Embodiment 1.
Figure 1B:
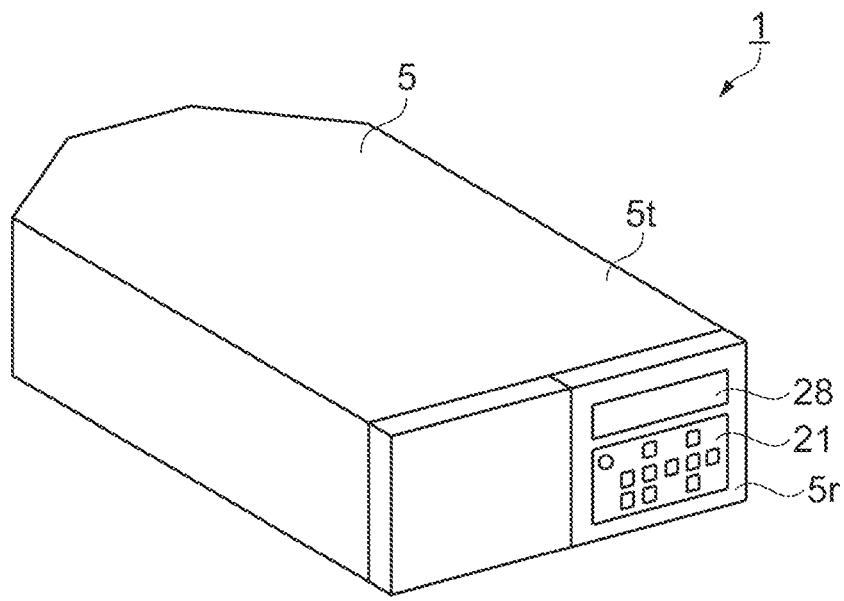

FIGS. 1A and 1B are perspective views of a projector according to Embodiment 1. FIG. 1A is a perspective view as seen from the front. FIG. 1B is a perspective view as seen from the rear.

As shown in FIG. 1A, a projector 1 includes a casing 5 for accommodating a device main body. A projection lens 13 is exposed on a front surface 5f of the casing 5. An image based on image information is projected from this projection lens 13 onto a projection surface (not shown in FIG. 1A) in front.

An image information input unit 30 to which image information is inputted is provided on a lateral surface 5s of the casing 5. A plurality of input terminals 30a is provided in the image information input unit 30.

A display unit 28 which displays information, and an operation panel 21 on which an input operation is carried out by a user, are provided on a rear surface 5r of the casing 5.

Figure 2:
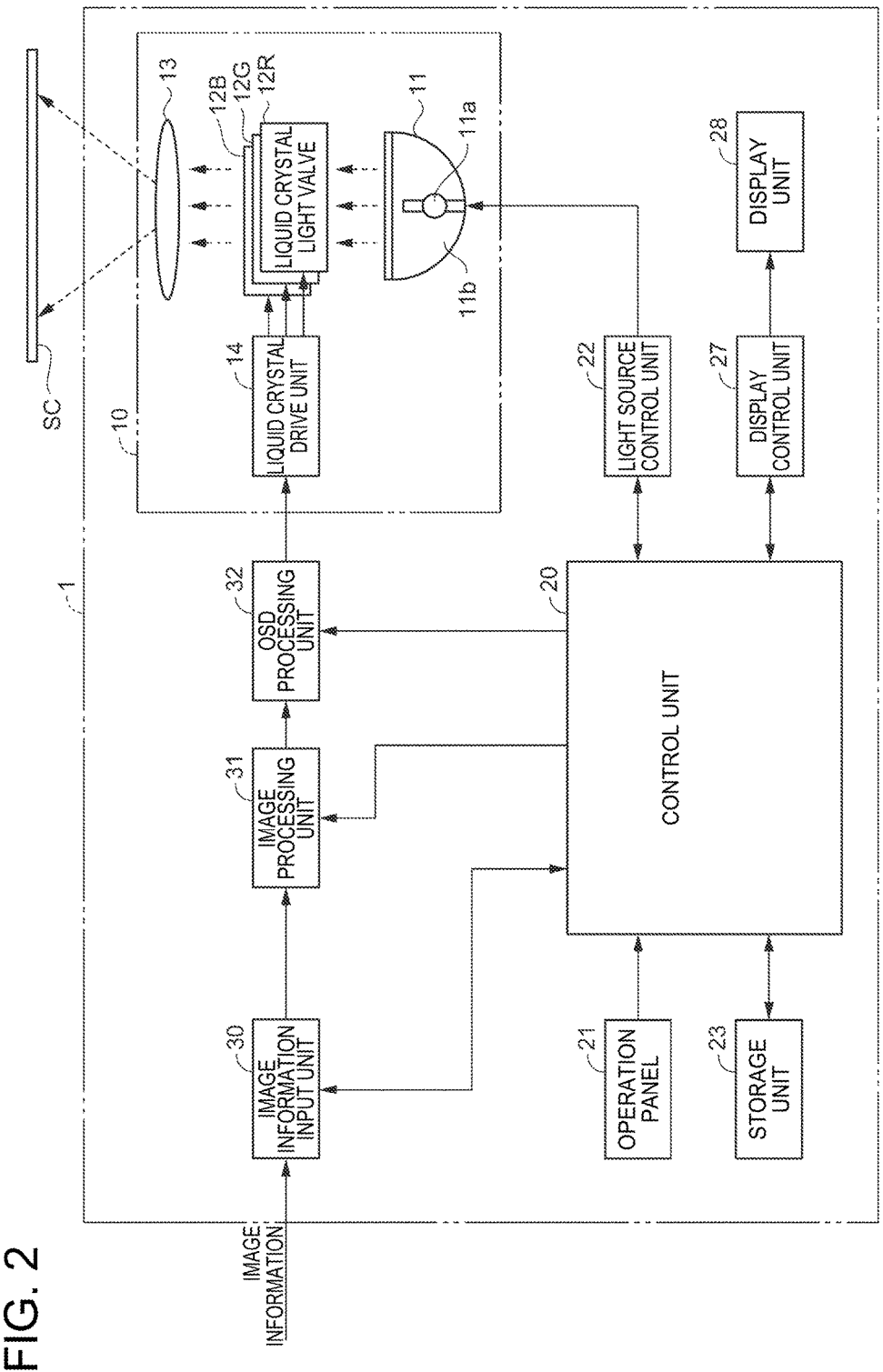
FIG. 2 is a block diagram showing the schematic configuration of the projector.

FIG. 2 is a block diagram showing the schematic configuration of the projector 1 according to Embodiment 1. The internal configuration of the projector 1 will be described, referring to FIG. 2.

The projector 1 includes an image projection unit 10, a control unit 20, the operation panel 21 as an instruction receiving unit, a light source control unit 22, a storage unit 23, a display control unit 27, the display unit 28, the image information input unit 30, an image processing unit 31, an OSD processing unit 32, and the like. These component units are accommodated in or arranged on the casing 5 (see FIGS. 1A and 1B).

The image projection unit 10 includes a light source unit 11 as a light source, three liquid crystal light valves 12R, 12G, 12B as a light modulator, the projection lens 13, a liquid crystal drive unit 14, and the like.

The light source unit 11 includes a discharge-type light source lamp 11a made up of an ultra-high pressure mercury lamp, metal halide lamp or the like, and a reflector 11b which reflects the light radiated by the light source lamp 11a toward the liquid crystal light valves 12R, 12G, 12B. The light emitted from the light source unit 11 is converted to a light having substantially uniform luminance distribution by an optical integration system, not shown. The light then separated into respective color light components of red (R), green (G) and blue (B), which are three primary colors of light, by a color separation system, not shown. Subsequently, the color light components become incident on the liquid crystal light valves 12R, 12G, 12B, respectively.

The liquid crystal light valves 12R, 12G, 12B are each formed by a liquid crystal panel having a pair of transparent substrates with liquid crystal enclosed between these substrates and other components. The liquid crystal light valves 12R, 12G, 12B have a rectangular pixel area where a plurality of pixels, not shown, is arrayed in the form of a matrix and a drive voltage can be applied to the liquid crystal on a pixel basis. As the liquid crystal drive unit 14 applies a drive voltage corresponding to inputted image information to each pixel, each pixel is set to a light transmittance corresponding to the image information. Therefore, the light emitted from the light source unit 11 is modulated by being transmitted through the pixel areas of the liquid crystal light valves 12R, 12G, 12B. Thus, an image light corresponding to the image information is formed for each color light. The image lights of the respective colors thus formed are combined on a pixel basis into a color image light by a light combining system, not shown, and then enlarged and projected on a projection surface such as a screen SC by the projection lens 13.

The control unit 20 has a CPU (central processing unit), a RAM used for temporary storage or the like of various data, a ROM as a non-volatile memory (these memories not illustrated), and the like. The control unit 20 centrally controls the operation of the projector 1 by causing the CPU to operate according to a control program stored in the ROM. The control unit 20 has a timer (not shown) and therefore can measure a predetermined time.

The operation panel 21 is provided on the rear surface 5r of the casing 5 of the projector 1 and has a plurality of operation keys (operation buttons) or the like for giving various instructions to the projector 1.

Now, the operation panel 21 will be described.

Figure 3:
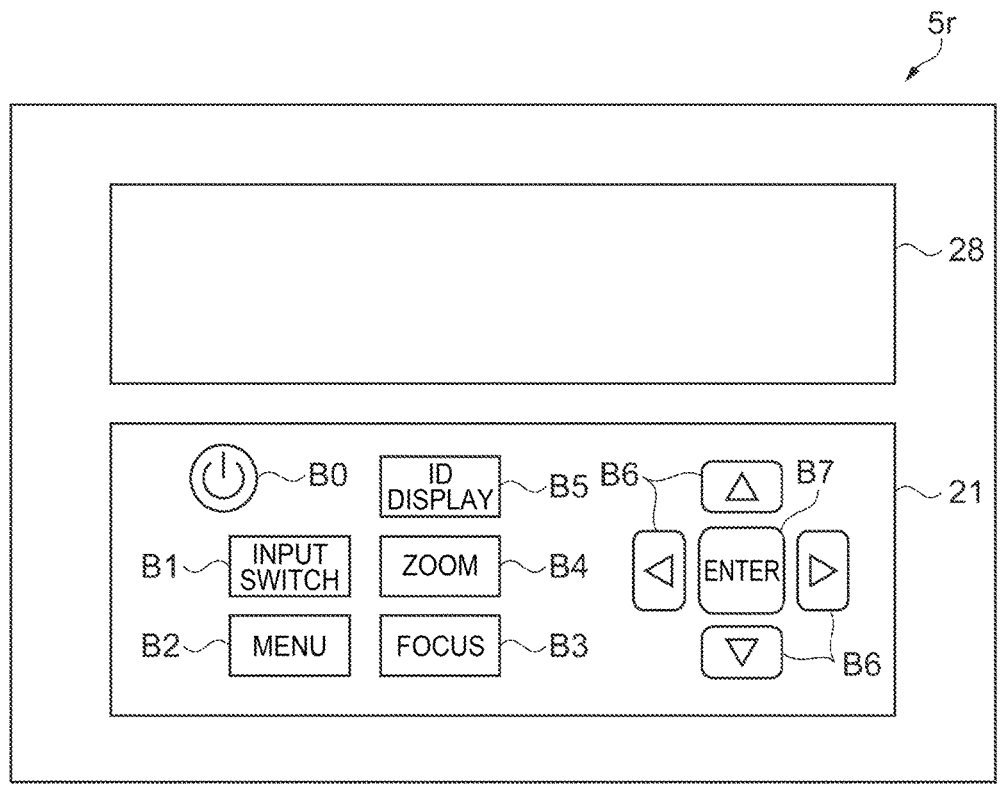
FIG. 3 is an explanatory view illustrating a part of the back side of a casing.

FIG. 3 is an explanatory view showing a part of the rear surface 5r of the casing 5. As shown in FIG. 3, the display unit 28 and the operation panel 21 are provided on the rear surface 5r of the casing 5. The display unit 28 is formed by a liquid crystal display or the like.

The operation keys provided on the operation panel 21 may include a power key B0 for turning on/off the power, an input switch key B1 for switching inputted image information, a menu key B2 for switching between display and non-display of a menu screen for various settings, a focus adjustment start key B3 for starting focus adjustment, a zoom adjustment start key B4 for starting zoom adjustment, an ID display start key B5 for starting ID display, cursor keys B6 used to move the cursor on the menu screen and to change an adjustment value in each lens adjustment state or the like, an enter key B7 for entering various settings, and the like. As the user operates the operation panel 21, the operation panel 21 outputs control information corresponding to the content of the user's operation, to the control unit 20.

Also, a remote controller (not shown) capable of remote control may be used as an input operation unit, instead of the operation panel 21 or in addition to the operation panel 21. In this case, the remote controller transmits an operation signal of infrared rays or the like corresponding to the content of the user's operation, and a remote control signal receiving unit, not shown, receives this operation signal and transmits the operation signal to the control unit 20.

Back to FIG. 2, the light source control unit 22 controls supply and stop of power to the light source unit 11 on the basis of an instruction from the control unit 20, and thus switches between the on and off states of the light source unit 11.

The storage unit 23 is made up of a non-volatile memory and stores ID information, position information on a projection image where the ID information is projected and displayed, and the like. As the user selects an ID information setting entry (not shown) on the menu screen, the control unit 20 receives the input of ID information and projection position information of the ID information. Specifically, the control unit 20 receives the input of an ID number as ID information (third instruction operation) and the selection of a projection position (second instruction operation).

As a method for selecting a projection position, the user may designate an arbitrary position on the screen, or the screen may be divided (for example, divided into nine sections) and one of the divided sections may be selected. The control unit 20 causes the storage unit 23 to store the ID information and the position information that are received. The control unit 20 at this point is equivalent to a projection position decision unit. Then, as the user carries out an ID information display operation, the control unit 20 reads out the ID information and the position information from the storage unit 23 and causes the ID information and the position information to be displayed on the projection image and on the display unit 28.

The display control unit 27 controls image display on the display unit 28. The display control unit 27 has a VRAM (video RAM), not shown. The display control unit 27 generates, based on an instruction from the control unit 20, image data of ID information and the like on the VRAM on a screen basis, then outputs the generated image data to the display unit 28, and causes the display unit 28 to display an image based on the image data. It should be noted that, in the normal state where the projector 1 is projecting an image based on an input image (where ID information, that is, an ID number is not displayed), the display control unit 27 causes the display unit 28 to display information such as an image signal name or the like of the input image.

The display unit 28 is made up, for example, of a liquid crystal display and displays an image corresponding to the image data inputted from the display control unit 27. It should be noted that, in this embodiment, a display drive unit (not shown) which drives the display unit 28 is assumed to be provided inside the display unit 28. It should also be noted that, the display unit 28 is not limited to a liquid crystal display and may also be formed by other display devices.

The image information input unit 30 has the plurality of input terminals 30a. Image information (image signals) in various formats is inputted to the image information input unit 30 from an external image supply device (not shown) such as a personal computer, video player, memory card, USB storage, or digital camera. The image information input unit 30 selects image information on the basis of an instruction from the control unit 20, converts the inputted image information into image data in a format that can be processed by the image processing unit 31, and outputs the converted image data to the image processing unit 31.

The image processing unit 31 adjusts brightness, contrast, sharpness, color tone and the like, and carries out various image quality adjustments such as gamma correction, on the image data inputted from the image information input unit 30 on the basis of an instruction from the control unit 20. The image processing unit 31 outputs the image data adjusted and processed in this manner, to the OSD processing unit 32.

The OSD processing unit 32 carries out processing to superimpose an OSD (on-screen display) image such as a menu screen or message screen on the image data inputted from the image processing unit 31 on the basis of an instruction from the control unit 20. The OSD processing unit 32 has an OSD memory, not shown, which stores OSD image data representing a graphic pattern, font and the like to form an OSD image. As the control unit 20 gives an instruction to superimpose an OSD image, the OSD processing unit 32 reads out necessary OSD image data from the OSD memory and combines this OSD image data with the image data inputted from the image processing unit 31 in such a way that the OSD image is superimposed at a predetermined position on the input image. The image data combined with the OSD image data is outputted to the liquid crystal drive unit 14. It should be noted that, if there is no instruction to superimpose an OSD image from the control unit 20, the OSD processing unit 32 outputs the image data outputted from the image processing unit 31, directly to the liquid crystal drive unit 14.

As the liquid crystal drive unit 14 drives the liquid crystal light valves 12R, 12G, 12B according to the image data inputted from the OSD processing unit 32, the liquid crystal light valves 12R, 12G, 12B modulate the incident light from the light source unit 11 into image lights according to the image data, and the image lights are projected from the projection lens 13.

Next, the processing by the projector 1 on receiving an ID display operation will be described, referring to a flowchart.

Figure 4:
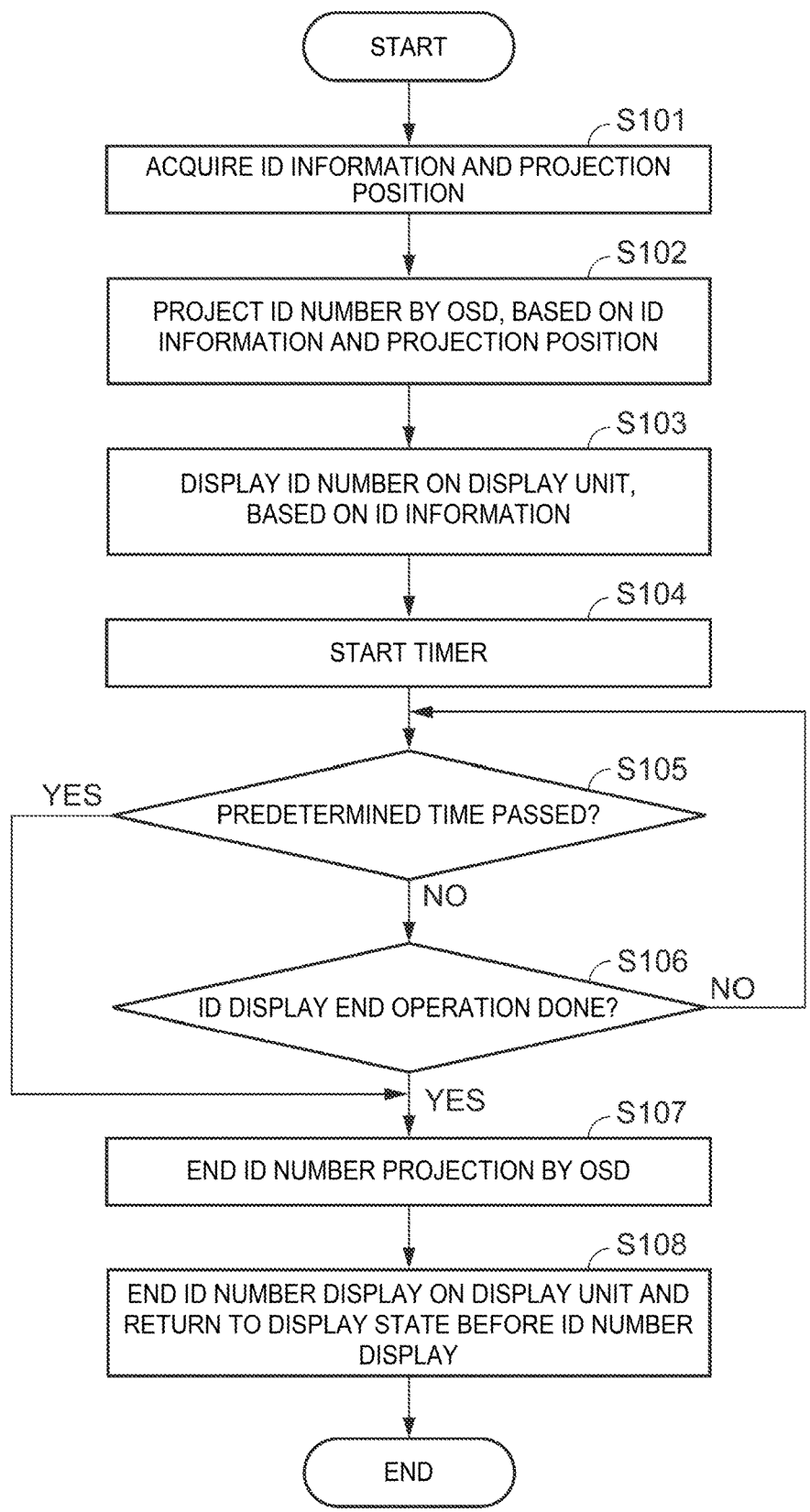
FIG. 4 is a flowchart showing ID display processing of the projector.

FIG. 4 is a flowchart showing the ID display processing by the projector 1 according to the embodiment.

As the user presses the ID display start key B5 provided on the operation panel 21, the control unit 20 acquires ID information and projection position information from the storage unit 23 (step S101). Here, the pressing operation on the ID display start key B5 is equivalent to a first instruction operation. The control unit 20 instructs the OSD processing unit 32 to superimpose and display the ID number based on the ID information, at the position based on the projection position information, on the input image (step S102). The control unit 20 instructs the display control unit 27 to cause the display unit 28 to display the ID number based on the ID information (step S103).

Here, a multi-projection system using five projectors similar to the projector 1 will be described, referring the drawings.

Figure 5A:
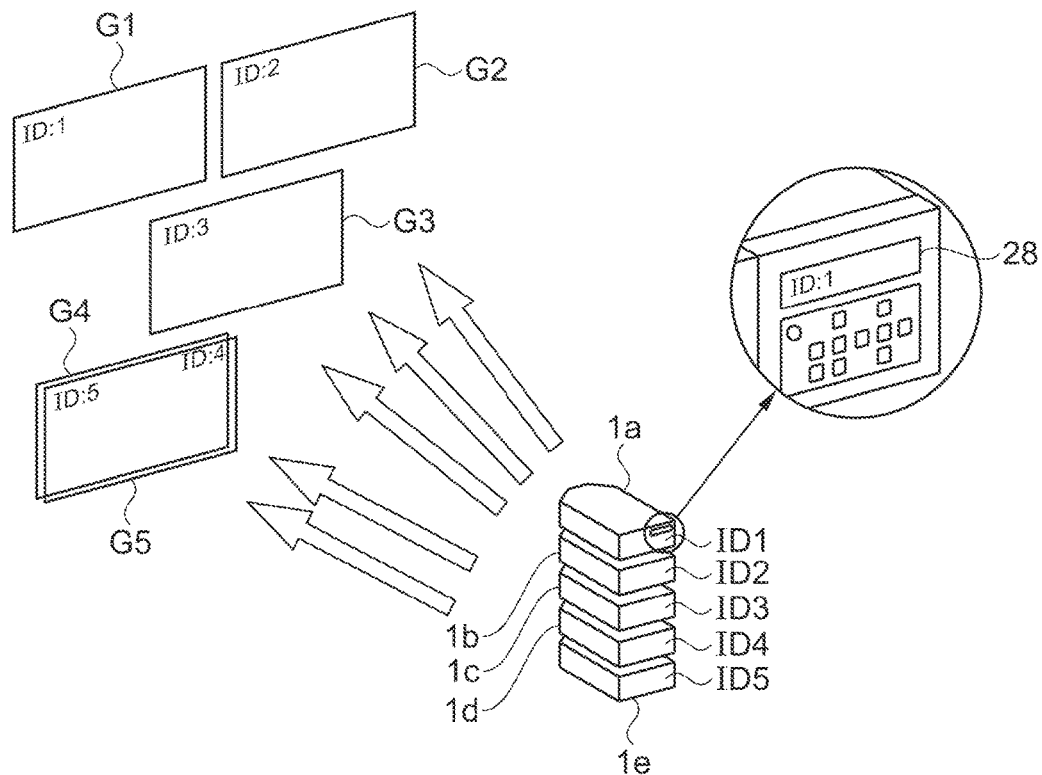
FIGS. 5A and 5B are explanatory views of a multi-projection system.
Figure 5B:
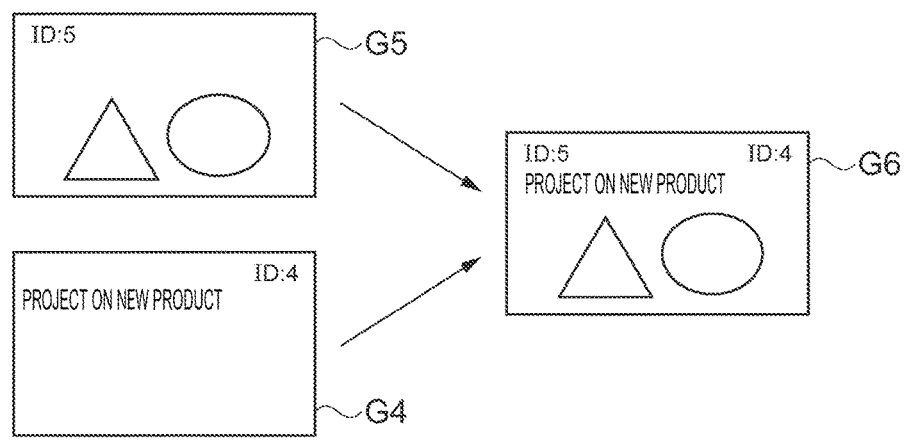

FIGS. 5A and 5B are explanatory views of the multi-projection system. FIG. 5A is an explanatory view showing the projection state of the five projectors. FIG. 5B is an explanatory view in the case where images are projected in a superimposed state.

As shown in FIG. 5A, the multi-projection system according to the embodiment includes five projectors 1a, 1b, 1c, 1d, 1e. The five projectors 1a, 1b, 1c, 1d, 1e are projectors having a similar configuration to the projector 1. The projectors 1a, 1b, 1c, 1d, 1e are installed in a stacked state.

Here, the ID information of the projector 1a is "1" and the projection position of the ID information is set to "top left" of the projection image. The ID information of the projector 1b is "2" and the projection position of the ID information is set to "top left". The ID information of the projector 1c is "3" and the projection position of the ID information is set to "top left". The ID information of the projector 1d is "4" and the projection position of the ID information is set to "top right". The ID information of the projector 1e is "5" and the projection position of the ID information is set to "top left".

The projection image of the projector 1a is an image G1. In the image G1, a letter string "ID:1" is projected and displayed at the top left as an OSD display. The projection image of the projector 1b is an image G2. In the image G2, a letter string "ID:2" is projected and displayed at the top left as an OSD display. The projection image of the projector 1c is an image G3. In the image G3, a letter string "ID:3" is projected and displayed at the top left as an OSD display. The projection image of the projector 1d is an image G4. In the image G4, a letter string "ID:4" is projected and displayed at the top right as an OSD display. The projection image of the projector 1e is an image G5. In the image G5, a letter string "ID:5" is projected and displayed at the top left as an OSD display. The image G4 and the image G5 are projected in a superimposed state (stack projection).

In addition, FIG. 5A also shows an enlarged view of the rear surface 5r of the projector 1a. On the display unit 28 on the rear surface 5r of the projector 1a, the letter string "ID:1" is displayed. Further, although not shown in FIG. 5A, the letter string of the corresponding ID number is displayed on the display units 28 of the projectors 1b, 1c, 1d, 1e.

Figure 6A:
FIGS. 6A, 6B, and 6C are explanatory views of an ID number displayed on a display unit of the projector.
Figure 6B:
Figure 6C:
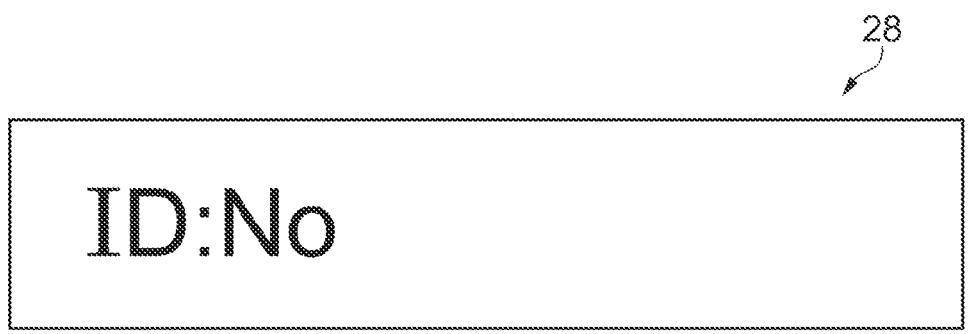

FIGS. 6A, 6B, and 6C are explanatory views of the ID number displayed on the display unit 28 of the projector 1. FIG. 6A is an explanatory view in the case where the ID information is "1". FIG. 61B is an explanatory view in the case where the ID information is "2". FIG. 6C is an explanatory view in the case where there is no ID information.

As shown in FIGS. 6A and 6B, the ID number corresponding to the ID information stored in the storage unit 23 is displayed on the display unit 28 of the projector 1 (1a, 1b, 1c, 1d, 1e). Specifically, the letter string of the ID number is displayed, such as "ID:1" in the case where the ID information is "1", and "ID:2" in the case where the ID information is "2". If no ID information is stored in the storage unit 23, a letter string "ID:No" indicating that there is no ID number is displayed, as shown in FIG. 6C.

Back to FIG. 5B, in the example of FIG. 5B, graphic patterns and a letter string are displayed in the image G4 and the image G5, respectively. The image G4 and the image G5 are projected in a superimposed state (stack projection) and thus displayed as an image G6. At this point, since the projection positions of the ID numbers are set apart from each other, the ID numbers do not overlap with each other on the image G6.

Back to FIG. 4, the control unit 20 starts the timer for measuring one minute as a predetermined time (step S104). The control unit 20 then determines whether a predetermined time has passed or not (step S105). If the predetermined time has passed (step S105: YES), the control unit 20 shifts to step S107.

If the predetermined time has not passed (step S105: NO), the control unit 20 determines whether an ID display end operation is done or not (step S106). Here, the ID display end operation is a press on the enter key B7, or the like. If the ID display end operation is not done (step S106: NO), the control unit 20 shifts to step S105. Although not illustrated, if the ID display start key B5 is pressed again before the predetermined time passes, the timer may be started again to extend the ID display time.

If the ID display end operation is done (step S106: YES), the control unit 20 instructs the OSD processing unit 32 to end the projection of the ID number (step S107). The control unit 20 also instructs the display control unit 27 to end the display of the ID number. Then, the display state before the ID number display is restored (step S108). The ID display processing ends there.

According to Embodiment 1 described above, the following effects are achieved.

(1) The projector 1 has the display unit 28 in the main body of the projector 1, in addition to the image projection unit 10. The storage unit 23 stores the ID information of the projector 1. As the control unit 20 receives a pressing operation on the ID display start key B5 provided on the operation panel 21, the control unit 20 causes the image projection unit 10 to project an ID number based on the ID information and causes the display unit 28 to display the ID number. Thus, since the ID number is displayed both on the projection image and on the display unit 28, the user can recognize the correspondence between the projector and the projection image. Therefore, in a multi-projection system using a plurality of projectors, the user can recognize which projector is projecting which image. This is advantageous at the time of adjusting the image or the like.

(2) The storage unit 23 of the projector 1 stores projection position information that represents the position on the projection image where the ID information is projected and displayed. The control unit 20 decides the position on the image (input image) where the ID information is projected, on the basis of the projection position information. The control unit 20 then causes the OSD processing unit 32 to display the ID number in the form of being superimposed on the input image, and causes the image projection unit 10 to project and display the image. Thus, the ID number can be projected and displayed at the position stored in the storage unit 23.

(3) According to the projector 1, the user can input ID information and projection position information of the ID information, using ID information setting entry on the menu screen. The control unit 20 causes the storage unit 23 to store the ID information and the projection position information of the ID information that are inputted. Thus, an ID number as the ID information, and the position on the projection image where the ID number is projected and displayed, can be set by user operations. Therefore, the user can set an arbitrary ID number for each projector. By varying the display position (projection position) of the ID number from projector to projector, it is possible to avoid a situation where projected ID numbers overlap with each other, in a multi-projection system. This is advantageous.

(4) According to the projector 1, after a pressing operation on the ID display start key B5 provided on the operation panel 21 is received, an ID number is projected and also displayed on the display unit 28 for a predetermined time (one minute). Thus, the projection of the ID number and the display on the display unit 28 are erased as the predetermined time passes. Therefore, even if the user forgets to erase the ID number, the ID number is erased after the lapse of the predetermined time. This is advantageous.

Embodiment 2

Next, Embodiment 2 of the invention will be described with reference to FIG. 7. It should be noted that in the following descriptions, the same reference numerals are given to the same elements as those in Embodiment 1, and the descriptions thereof will be omitted.

Figure 7:
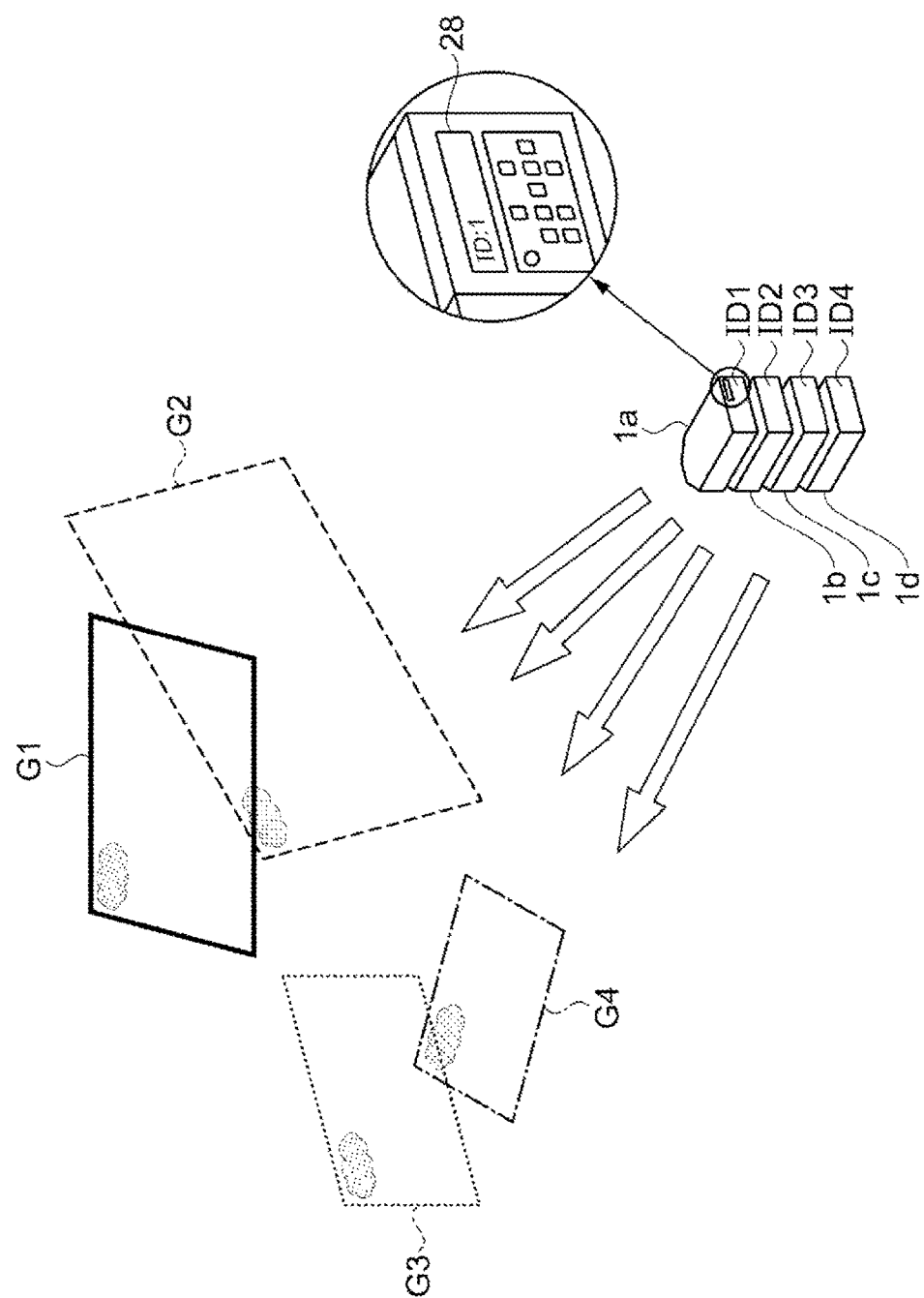
FIG. 7 is an explanatory view of a multi-projection system in Embodiment 2.
Figure 8:
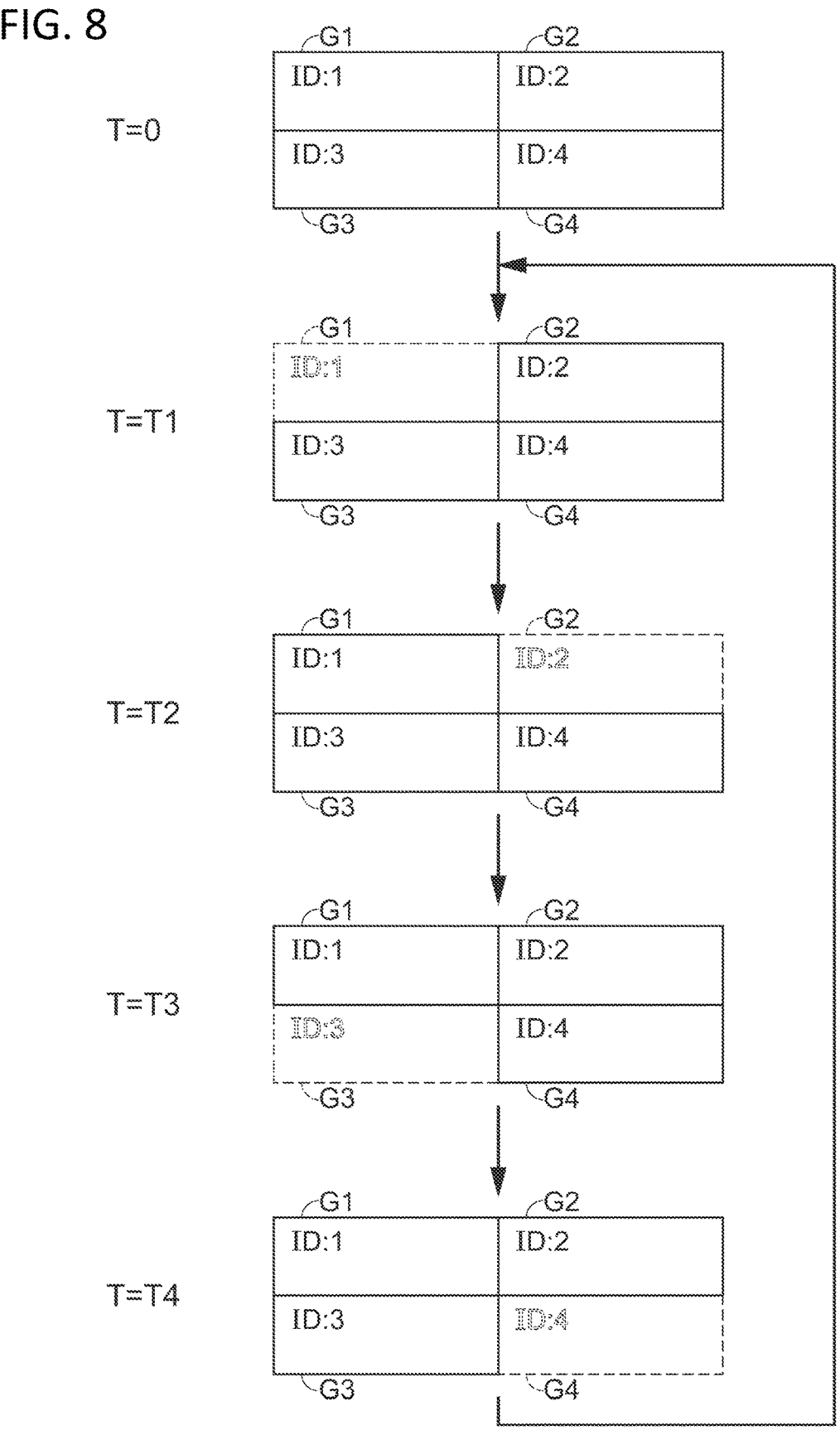
FIG. 8 is a view for explaining blinking display of projection images.

FIG. 7 is an explanatory view representing projection by four projectors. In Embodiment 2, a state in which the ID numbers are projected after four projectors 1a, 1b, 1c and 1d are installed in a superimposed manner is illustrated.

In such a state, since the projection angle adjustment of the projectors 1a, 1b, 1c and 1d and the focal points of projection lens are not yet adjusted immediately after the start of projection, it is assumed that images G1, G2, G3 and G4 to be projected are different from one another in size, angle and projection position.

In addition, although the respective ID numbers are projected in the images G1, G2, G3 and G4, respectively, as an OSD display, since it is a state before the focus adjustment of the projection lens 13 is carried out, it is assumed that it is hard to visually recognize the projected ID numbers.

In Embodiment 2, the control unit 20 projects an image of a frame corresponding to the ID number on an outer edge of an area where the projector 1 can project. In this case, the control unit 20 decides a color of the frame according to the ID number. That is, the color of the frame decided by the control unit 20 is not the same color as the color of the frame projected by other projectors 1 having a different ID number. It should be noted that even if the focus adjustment of the projection lens 13 is not yet carried out, a user can discriminate the differences of the colors of the frames.

In addition, the control unit 20 may decide a line type of a frame line representing the frame according to the ID number. With this, the user can recognize the ID number corresponding to the projection image from the color of the frame or the line type.

In addition, the control unit 20 changes the projected frame when it is detected that an operation (fourth instruction operation) such as projection position adjustment and focus adjustment is instructed by the user. In Embodiment 2, the control unit 20 changes the width of the frame line (thickness) so as to be different from the width when no operation is performed.

For example, in FIG. 7, when the user performs an operation to adjust the projection state of the projector 1a, the projector 1a may set the width of the frame line projected in the image G1 to two to three times of the width of the frame line projected by other projectors 1b, 1c and 1d, or may enlarge the width of the frame line projected in the image G1 to a width value obtained by multiplying the resolution of the projector 1 by a predetermined ratio. With this, the user can discriminate the image G1 projected by the projector 1a, which is operated, among the images G1, G2, G3 and G4.

In addition, the control unit 20 may display the frame using a predetermined color or design representing that the projector is in operation. For example, the frame being operated may be drawn in a blinked manner. Further, the color, the design and the width of the frame line used for the frame to be changed may be preset by the user.

Further, the frame may be in a shape in which four sides of the peripheral edge of the projection image are completely closed, or may be in a partially opened shape.

It should be noted that, in Embodiment 2, when the user press the ID display start button B5, it is assumed that the projector 1 projects the frame in conjunction with the start of projection of the ID number. However, it can also be assumed that the projector 1 projects the frame for a predetermined time irrespective of the pressing operation of the ID display start key B5 if the multi-projection system is activated.

According to Embodiment 2 described above, in addition to the effects described in Embodiment 1, the following effect is achieved.

(5) The projector 1 generates a frame according to the ID number and projects the generated frame on the outer edge of the projection area when the pressing operation of the ID display start key B5 to display the ID number both in the projection image and on the display unit 28. In addition, when a user's operation is further detected, the projector 1 thickens the width of the projected frame line, and allows the user to understand that it is the projected image of the projector 1 being operated. Thus, in case of building the multi-projection system, even if the focus positions or the projection positions of the respective projectors 1 are not yet adjusted, not only it is possible to recognize the projection image and the ID number in an associated manner, but also it is possible to easily discriminate the projection image projected by the projector 1 being operated. For this reason, it is possible to easily and promptly adjust the projector 1.

The invention is not limited to the embodiments descried above and can be carried out with various changes, improvements and the like. Modifications will be described below.

Modification 1

In the embodiment, the predetermined time for which the ID number is projected and displayed is one minute. However, the predetermined time is not limited to one minute. Also, the projection and display of the ID number may be continued until the user carries out the ID display end operation, without measuring the predetermined time.

Modification 2

In the embodiment, an ID number is projected and displayed by a pressing operation on the ID display start key B5 provided on the operation panel 21. However, an ID information display entry (not shown) may be provided on the menu screen, and an ID number may be projected and displayed when the ID information display entry is selected.

Modification 3

In this embodiment, ID information (ID number) is set (stored) in the storage unit 23 of the projector 1, using the ID information setting entry (not shown) on the menu screen. However, numeric keys and an ID information setting key may be provided on a remote controller (not shown), and ID information may be set in the storage unit 23 of the projector 1, using these keys.

Modification 4

In the embodiment, an ID number is projected and displayed on a projection image. However, the ID number and the projection image may be displayed in such a way as to blink. For example, it is possible to display the ID number and the projection image in such a way as to blink for 30 seconds from the start of ID display. Thus, when projection images are projected in a superimposed state (stack projection), the correspondence between the projection images and the projectors can be recognized easily.

Also, when ID display is started, one of the image G1 projected by the projector 1*a*, the image G2 projected by the projector 1*b*, the image G3 projected by the projector 1*c* and the image G4 projected by the projector 1*d* may projected in such a way as to flash on and off along with the ID number (flashing projection), and the other three may continue to be projected normally without flashing on and off (normal projection), as shown in FIG. 7.

Moreover, the projectors 1 projecting images in such a way as to flash on and off may be sequentially switched on the basis of the ID information. For example, at a time T1, the projector 1*a* having the ID information "1" stored in the storage unit 23 may carry out flashing projection in which the ID number (ID:1) and the image G1 are projected in such a way as to flash on and off, and the other projectors (projectors 1*b*, 1*c*, 1*d*) may carry out normal projection.

At a time 12, the projector 1*b* having the ID information "2" stored in the storage unit 23 may carry out flashing projection and the other projectors (projectors 1*a*, 1*c*, 1*d*) may carry out normal projection. At a time 13, the projector 1*c* having the ID information "3" stored in the storage unit 23 may carry out flashing projection and the other projectors (projectors 1*a*, 1*b*, 1*d*) may carry out normal projection. At a time 14, the projector 1*d* having the ID information "4" stored in the storage unit 23 may carry out flashing projection and the other projectors (projectors 1*a*, 1*b*, 1*c*) may carry out normal projection.

That is, the projector 1 carrying out flashing projection may be switched among the plurality of projectors 1 with different ID information, without an overlap between the respective times of flashing projection. In this case, the control unit 20 of the projector 1 may switch between flashing projection and normal projection in such a way that the time of flash projection when first ID information (for example, ID information "1") is stored in the storage unit 23 (or displayed on the display unit 28) and the time of flashing projection when second ID information (for example, ID information "2") that is different from the first ID information is stored in the storage unit 23 (or displayed on the display unit 28) do not overlap with each other. Thus, the correspondence between the projection image and the ID number that are displayed in a superimposed state and the projector 1 can be recognized easily.

It should be noted that the flashing projection is not limited to a mode in which the image and the ID number flash on and off together. A mode in which only the image is made to flash on and off, and a mode in which only the ID number is made to flash on and off can also be considered. Also, it is possible to allow the user to set in advance an object to flash and the time interval to switch between flashing projection and normal projection.

Modification 5

Figure 9:
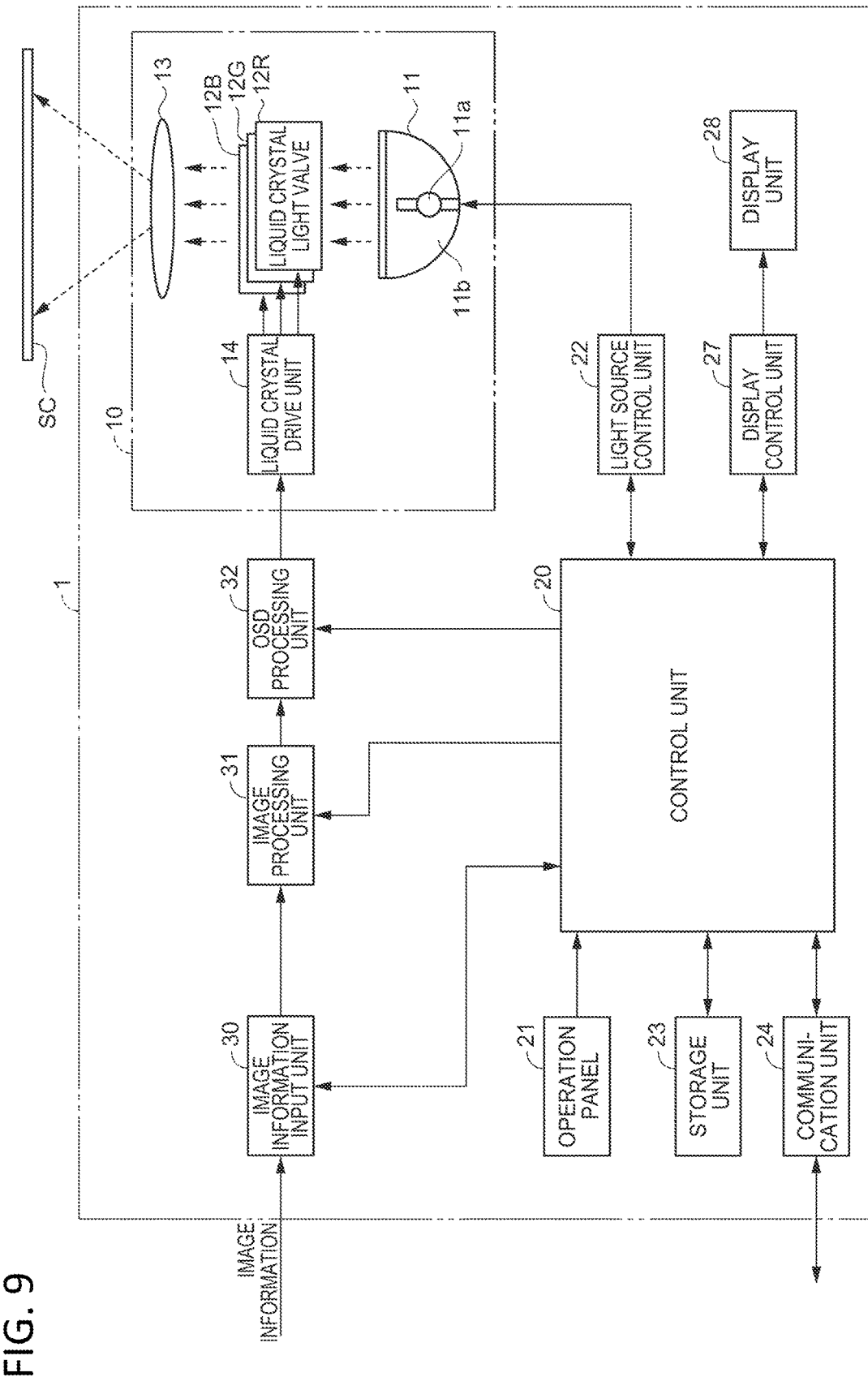
FIG. 9 is a block diagram showing the configuration of a projector.

In the embodiment, an input of the projection position information of an ID number by the user is received via the ID information setting entry on the menu screen. However, a communication unit 24 that enables communication among a plurality of projectors forming a multi-projection system may be provided in each projector, and the projectors may communicate with each other, as shown in the block diagram of FIG. 9. Thus, it is possible to automatically decide the projection positions of the ID numbers in such a way that these ID numbers do not overlap with each other. This enables omission of the user's operation to input the projection position information of the ID number.

Modification 6

In the embodiment, an input of the projection position information of an ID number by the user is received via the ID information setting entry on the menu screen. However, the projection position of each ID number may be decided in advance. This enables omission of the user's operation to input the projection position information of the ID number.

Figure 10:
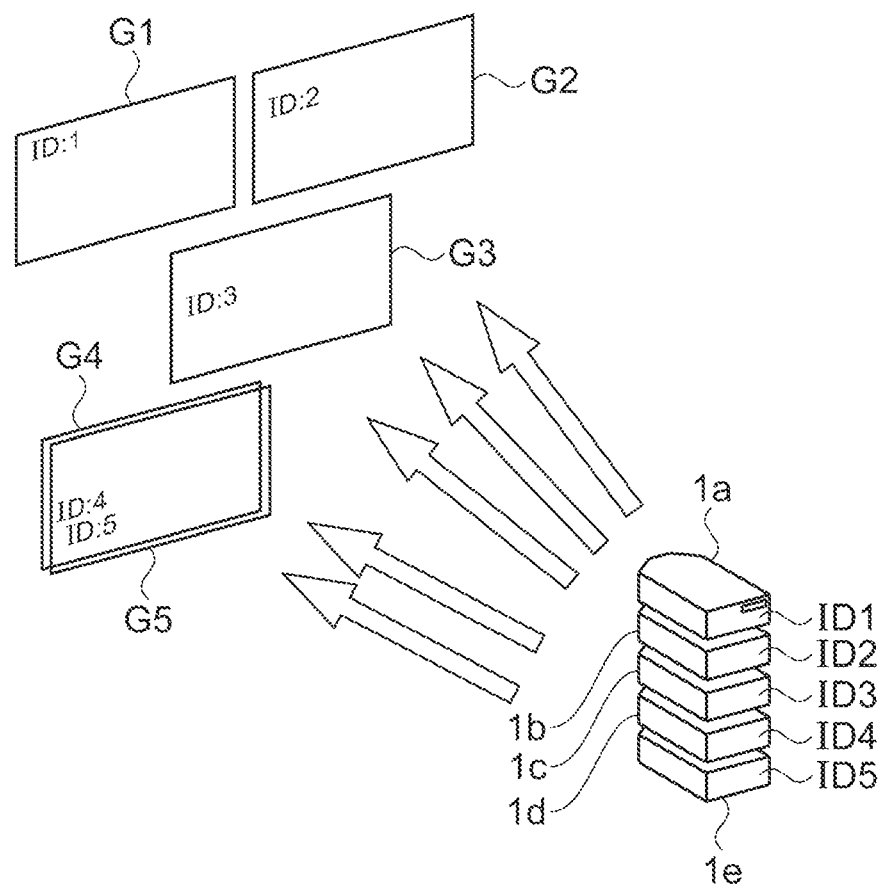
FIG. 10 is a view showing a projection example using five projectors.

For example, the respective ID numbers may be arranged vertically on the left side of the images, as shown in the projection example of FIG. 10. Also, the projection position of each ID number may be decided in advance in such away that the respective ID numbers are arranged at positions that do not overlap with each other when the images G1 to G5 are projected in a superimposed state. For example, the projection position of each ID number may be decided in such a way that the respective ID numbers are projected in order from top to bottom without overlapping with each other, as shown in the projection example of FIG. 10. In this case, even when the respective images are projected in the form of stack projection, the projection positions of the ID numbers do not overlap with each other and each ID number can be easily identified.

Figure 11:
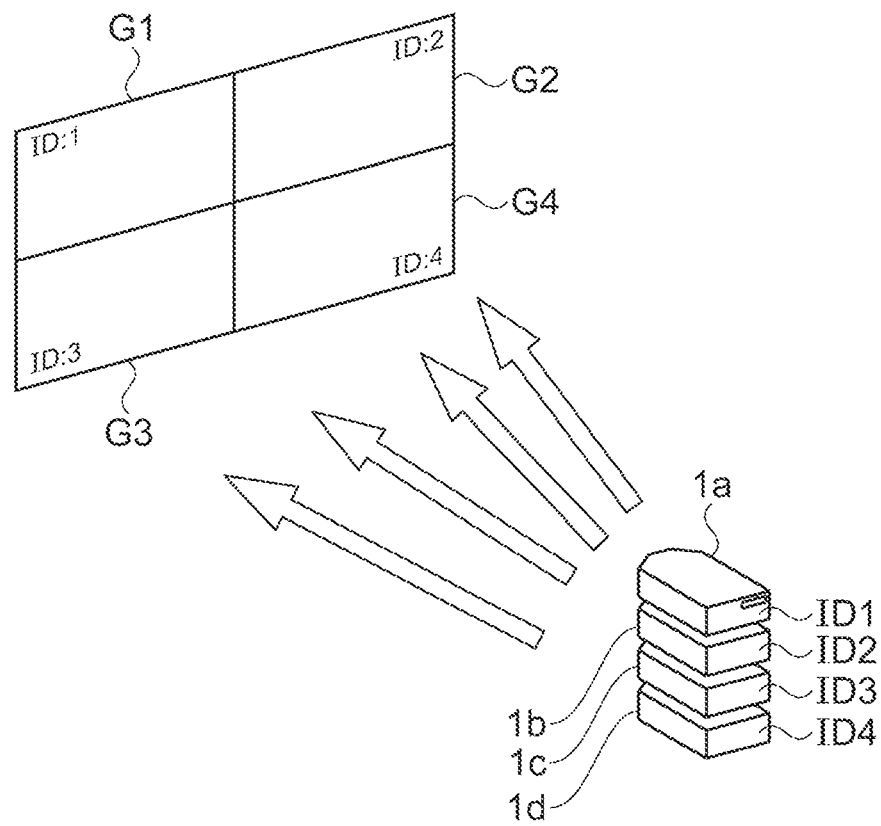
FIG. 11 is a view showing a projection example using four projectors.

Also, a mode in which the projection positions of the ID numbers are automatically adjusted according to the arrangement of the respective images (G1 to G4) can be considered, as shown in the projection example of FIG. 11. For example, when the image G1, the image G2, the image G3 and the image G4 are projected next to each other, positions away from the neighboring images may be decided as the projection positions of the ID numbers. Thus, good visibility of the ID numbers can be maintained.

Modification 7

In the embodiment, the light source unit 11 has the discharge-type light source lamp 11*a*. However, a solid light source such as LED (light emitting diode) light source or laser, or other types of light sources can also be used.

Modification 8

In the embodiment, the projector 1 uses the transmission-type liquid crystal light valves 12R, 12G, 12B, as a light modulator. However, a reflection-type light modulator such as a reflection-type liquid crystal light valve can also be used. Moreover, a micro-mirror array device or the like which controls the emitting direction of incident light for each micro-mirror as a pixel and thus modulates the light emitted from the light source, can be used as a light modulator.

The invention claimed is:

1. A projector configured to be provided in a multi-projection system in which two or more projectors are configured to concurrently project images onto a projection surface, the projector comprising:
   an image projection unit which projects an image;
   a display unit provided on an external surface of a main body of the projector;
   a storage unit which stores ID information of the projector;
   an instruction receiving unit which receives an instruction to the projector; and
   a control unit which causes the image projection unit to project the ID information stored in the storage unit and causes the display unit to display the ID information concurrently while the image projection unit projects the ID information, when the instruction receiving unit receives a first instruction operation.

2. The projector according to 1, further comprising a projection position decision unit which decides a position on a projection image where the ID information is projected and displayed,
   wherein the control unit causes the image projection unit to project and display the ID information at the position on the projection image decided by the projection position decision unit.

3. The projector according to claim 2,
   wherein the projection position decision unit decides the position on the projection image where the ID information is projected and displayed, on the basis of a second instruction operation received by the instruction receiving unit, and causes the storage unit to store the position.

4. The projector according to claim 1,
   wherein the control unit causes the storage unit to store the ID information on the basis of a third instruction operation received by the instruction receiving unit.

5. The projector according to claim 1,
   wherein the control unit causes the image projection unit to project the ID information and causes the display unit to display the ID information for a predetermined time after the instruction receiving unit receives the first instruction operation.

6. The projector according to claim 1,
   wherein the control unit switches between normal projection in which the ID information and the image are projected without flashing on and off and flashing projection in which the ID information and the image are projected in such a way as to flash on and off.

7. The projector according to claim 6,
   wherein the control unit controls switching between the normal projection and the flashing projection on the basis of the ID information in such a way that the flashing projection when the storage unit stores first ID information and the flashing projection when the storage unit stores second ID information that is different from the first ID information do not overlap with each other.

8. The projector according to claim 1,
   wherein the control unit causes the image projection unit to project an image of a frame according to the ID information when the instruction receiving unit receives the first instruction operation.

9. The projector according to claim 8,
   wherein the control unit changes the frame projected by the image projection unit when the instruction receiving unit further receives a forth instruction operation after the instruction receiving unit receives the first instruction operation.

10. The projector according to claim 8,
    wherein the control unit sets a color of the frame according to the ID information.

11. The projector according to claim 8,
    wherein the control unit causes the image of the frame to be projected on an outer edge of an area where the image projection unit can project.

12. A control method for a projector configured to be provided in a multi-projection system in which two or more projectors are configured to concurrently project images onto a projection surface, the projector including an image projection unit which projects an image and a storage unit which stores ID information,
    the projector further including a display unit provided on an external surface of a main body of the projector, and the method comprising:
    an instruction receiving step of receiving an instruction to the projector; and
    a control step of causing the image projection unit to project the ID information stored in the storage unit and causing the display unit to display the ID information concurrently while the image projection unit projects the ID information, when a first instruction operation is received by the instruction receiving step.

* * * * *